(12) United States Patent
Blasius

(10) Patent No.: US 11,511,941 B2
(45) Date of Patent: Nov. 29, 2022

(54) DISCHARGE BELT FOR A PALLETISING DEVICE

(71) Applicant: Koerber Supply Chain Automation Eisenberg GmbH, Eisenberg (DE)

(72) Inventor: Christopher Blasius, Boerrstadt (DE)

(73) Assignee: Koerber Supply Chain Automation Eisenberg GmbH, Eisenberg (DE)

( * ) Notice: Subject to any disclaimer, the term of this patent is extended or adjusted under 35 U.S.C. 154(b) by 0 days.

(21) Appl. No.: 17/269,401

(22) PCT Filed: Aug. 15, 2019

(86) PCT No.: PCT/EP2019/071951
§ 371 (c)(1),
(2) Date: Feb. 18, 2021

(87) PCT Pub. No.: WO2020/038829
PCT Pub. Date: Feb. 27, 2020

(65) Prior Publication Data
US 2021/0245959 A1    Aug. 12, 2021

(30) Foreign Application Priority Data
Aug. 21, 2018    (DE) .......................... 102018214048.0

(51) Int. Cl.
*B65G 23/44*    (2006.01)
*B65G 39/16*    (2006.01)
(Continued)

(52) U.S. Cl.
CPC ............. *B65G 23/44* (2013.01); *B65G 39/16* (2013.01); *B65G 57/06* (2013.01); *B65G 57/24* (2013.01); *B65G 2201/0267* (2013.01)

(58) Field of Classification Search
CPC ........ B65G 23/44; B65G 39/16; B65G 57/06; B65G 57/24; B65G 2201/0267; B65G 15/28; B65G 15/30; B65G 23/00
(Continued)

(56) References Cited

U.S. PATENT DOCUMENTS

2013/0248634 A1    9/2013   Hiruma et al.
2015/0151930 A1    6/2015   Kollmuss et al.

FOREIGN PATENT DOCUMENTS

CA           2578427 C        8/2014
CN         105000325      * 10/2015    ............. B65G 15/64
(Continued)

OTHER PUBLICATIONS

International Search Report for PCT/EP2019/071951, dated Nov. 8, 2019, 8 pages.

*Primary Examiner* — Lynn E Schwenning
(74) *Attorney, Agent, or Firm* — Dority & Manning, P.A.

(57) ABSTRACT

The invention relates to a set-down belt for a palletizing apparatus, comprising a circulating conveyor belt that defines a conveying face for conveying goods, a first deflection roller that is rotatable about a first axis of rotation, and a tensioning roller that is rotatable about a tensioning axis and is movable in a tensioning direction (S). Here, a second deflection roller that is rotatable about a second axis of rotation is provided, wherein the second axis of rotation extends parallel to the first axis of rotation. The tensioning roller is movable such that the tensioning axis extends in an inclined manner with respect to the first axis of rotation and in an inclined manner with respect to the second axis of rotation. The invention also relates to a palletizing apparatus that comprises at least one set-down belt according to the invention.

10 Claims, 4 Drawing Sheets

(51) Int. Cl.
*B65G 57/06* (2006.01)
*B65G 57/24* (2006.01)

(58) Field of Classification Search
USPC .......................................................... 198/813
See application file for complete search history.

(56) References Cited

FOREIGN PATENT DOCUMENTS

| | | | | | |
|---|---|---|---|---|---|
| CN | 205058864 | * | 3/2016 | .............. | B41J 11/00 |
| DE | 68859 | | 9/1969 | | |
| DE | 102015101118 | | 8/2015 | | |
| EP | 2995421 | | 3/2016 | | |
| JP | S58125507 | | 7/1983 | | |
| KR | 20130046573 | | 5/2013 | | |

* cited by examiner (A - A)

DISCHARGE BELT FOR A PALLETISING DEVICE

The invention relates to a set-down belt for a palletizing apparatus, comprising a circulating conveyor belt that defines a conveying face for conveying goods, a first deflection roller that is rotatable about a first axis of rotation, and a tensioning roller that is rotatable about a tensioning axis and is movable in a tensioning direction. The invention also relates to a palletizing apparatus that comprises at least one set-down belt according to the invention.

PRIOR ART

A palletizing apparatus is used to arrange goods, in particular piece goods, or containers for transport on pallets. To this end, the goods are, for example, initially combined into individual layers and then set down in layers on a pallet, or on a layer stack already located on the pallet. Such a palletizing apparatus is known for example from the document EP 2 881 347 B1.

In order to be palletized, the goods or containers normally pass initially through a feed apparatus, in which the goods or containers, which initially arrive in one or more rows one after another, are rearranged and/or assembled into stackable layers. The stackable layers are then transferred successively to the palletizing apparatus, which sets down the layers on a desired stacking location, in particular on a pallet.

To this end, the palletizing apparatus comprises for example a set-down table, in a further development a set-down belt, which comprises a circulating conveyor belt. The conveyor belt defines a conveying face for conveying the goods or containers, or the layers. The set-down belt of the palletizing apparatus is generally movable vertically on a lifting device.

During palletization, in each case one stackable layer is conveyed by the feed apparatus onto the conveying face of the set-down belt. The set-down belt is moved vertically to the height corresponding to the layer stack. Subsequently, the layer is set down on the layer stack. The bottommost layer of a layer stack is in this case set down directly on the pallet.

During operation of the set-down belt, it is possible for the conveyor belt to drift or trend to the side. This effect arises all the more so in conveyor belts in which a length of the conveying face is approximately equal to a width of the conveying face. When the length of the conveying face is much greater than the width of the conveying face, this effect arises only to a limited extent.

The document DD 68 859 A1 discloses a belt-edge regulating device for conveyor belts, in particular for potato harvesting machines. Therein, a circulating belt is guided over two rollers that are arranged in an offset manner with respect to one another. As a result of one of the two rollers being pivoted relative to the other roller, lateral drift of the belt is counteracted. In order to pivot the roller, a motor with a spindle is provided.

The document EP 2 995 421 A1 discloses a sanding machine having a circulating sanding belt that is guided over a sanding roller and over a tensioning roller. The tensioning roller can be pivoted about an axis by means of an actuator in order to set a position of the belt. In order to identify the position of the sanding belt, a position detector is provided, which is configured as a forked light barrier. The position detector is connected to a regulator, which controls the actuator.

The document DE 10 2012 005 439 A1 discloses an apparatus for influencing a running material web. The apparatus in that case has an adjustable roller that deflects the material web.

PROBLEM

The problem addressed by the present invention is that of improving a set-down belt for a palletizing apparatus of the type mentioned at the beginning. In particular, the problem addressed by the invention is that of allowing belt-edge regulation of the set-down belt during operation of the palletizing apparatus, wherein a conveying face remains unchanged.

SOLUTION

This problem is solved by a set-down belt for a palletizing apparatus having the features of claim 1. Advantageous configurations and developments of the invention are the subject matter of the dependent claims.

A generic set-down belt for a palletizing apparatus comprises a circulating conveyor belt that defines a conveying face for conveying goods, a first deflection roller that is rotatable about a first axis of rotation, and a tensioning roller that is rotatable about a tensioning axis. The tensioning roller is in this case movable in a tensioning direction.

The conveyor belt bears on the first deflection roller and on the tensioning roller. The tensioning roller is movable relative to the first deflection roller. As a result of the tensioning roller being moved in the tensioning direction relative to the first deflection roller, a mechanical tension in the conveyor belt can be set.

According to the invention, a second deflection roller that is rotatable about a second axis of rotation is provided. In this case, the second axis of rotation extends parallel to the first axis of rotation. The tensioning roller is movable such that the tensioning axis extends in an inclined manner with respect to the first axis of rotation and in an inclined manner with respect to the second axis of rotation.

In an optimal operating state of the set-down belt, the conveyor belt is configured in a homogeneous manner and runs in a central region over the first deflection roller, the second deflection roller and the tensioning roller. In this case, the tensioning axis extends parallel to the first axis of rotation. If, in actual operation of the set-down belt, the conveyor belt drifts to the side, i.e. in the axial direction with respect to the first axis of rotation, this can be corrected by an appropriate movement of the tensioning roller. In this case, the tensioning roller can be moved such that the tensioning axis no longer extends parallel but in an inclined manner with respect to the first axis of rotation and in an inclined manner with respect to the second axis of rotation. An appropriate movement of the tensioning roller thus allows belt-edge regulation of the set-down belt.

The set-down belt is configured such that the conveying face for conveying goods extends substantially between the first deflection roller and the second deflection roller. Laterally, the conveying face is bounded by the belt edges of the conveyor belt. The conveying face is thus configured in the form of a rectangle. The rectangular shape of the conveying face is retained even when the tensioning roller is moved such that the tensioning axis extends in an inclined manner with respect to the first axis of rotation and in an inclined manner with respect to the second axis of rotation. The conveying face thus remains unchanged regardless of the orientation of the tensioning roller and of the tensioning axis. The belt-edge regulation of the set-down belt thus does not cause any change to the conveying face.

When a feed apparatus for feeding the goods or layers to be palletized is provided, the palletizer can be oriented such that a distance between the feed apparatus and the conveying face is minimal. As a result of the belt-edge regulation of the set-down belt, advantageously a minimal gap arises between the feed apparatus and the conveying face. This reduces the risk of goods to be palletized falling over upon being transferred from the feed apparatus to the conveying face.

According to one advantageous configuration of the invention, the tensioning roller is pivotable about a pivot axis. Particularly advantageously, the pivot axis extends at right angles to the first axis of rotation. Preferably, the pivot axis also extends at right angles to the conveying face of the conveyor belt. The pivot axis can also extend parallel or at some other angle to the conveying face of the conveyor belt.

According to one possible configuration of the invention, the tensioning axis intersects the pivot axis. According to another possible configuration of the invention, the tensioning axis and the pivot axis are oriented in a skew manner with respect to one another and therefore do not intersect one another.

Preferably, the pivot axis is arranged in a first axial end region of the tensioning roller. According to one possible configuration of the invention, the pivot axis passes through the conveying face. According to another possible configuration of the invention, the pivot axis extends laterally next to the conveying face or parallel to the conveying face.

According to one advantageous development of the invention, actuating means for moving the tensioning roller in the tensioning direction are provided in a second axial end region of the tensioning roller, which is opposite the first axial end region of the tensioning roller. Upon appropriate actuation by the actuating means, the tensioning roller is pivoted about the pivot axis. As a result, the orientation of the tensioning axis changes.

Preferably, the actuating means comprise an actuating motor and a spindle gear. Particularly preferably, the set-down belt also comprises a sensor unit for identifying at least one belt edge of the conveyor belt, and an electronic regulating device. The regulating device is in this case connected to the sensor unit and to the actuating motor, for example via data lines or a bus system. If the sensor unit detects a lateral offset of the belt edge of the conveyor belt, the regulating device controls the actuating motor appropriately. As a result, the tensioning roller is pivoted about the pivot axis such that said lateral offset of the belt edge is compensated again.

According to one advantageous development of the invention, tensioning means for moving the tensioning roller in the tensioning direction are provided in the first axial end region of the tensioning roller. Upon appropriate actuation by said tensioning means, the tensioning roller is moved, with the result that the mechanical tension in the conveyor belt is set. Preferably, the set-down belt also comprises a sensor unit for identifying the mechanical tension in the conveyor belt.

According to one possible configuration of the invention, the tensioning means comprise a manually actuable threaded spindle. A manually actuable threaded spindle is comparatively cost-effective.

According to another possible configuration of the invention, the tensioning means comprise an actuating motor and a spindle gear. Such a configuration allows, in conjunction with a corresponding sensor unit, automatic setting of the mechanical tension in the conveyor belt.

Preferably, the tensioning direction extends at right angles to the first axis of rotation and at right angles or tangentially to the pivot axis. Preferably, the pivot axis also extends parallel to the conveying face of the conveyor belt. The tensioning direction can also extend at right angles or at some other angle to the conveying face of the conveyor belt.

According to one advantageous development of the invention, a third deflection roller that is rotatable about a third axis of rotation is provided. In this case, the third axis of rotation extends parallel to the first axis of rotation.

According to a further advantageous development of the invention, a drive drum that is rotatable about a drive axis is provided. In this case, the drive axis extends parallel to the first axis of rotation. The drive drum is preferably assigned an electric drive motor, which drives the drive drum in rotation.

The problem is also solved by a palletizing apparatus having the features of claim 10. The palletizing apparatus according to the invention comprises at least one set-down belt according to the invention.

FIGURES AND EMBODIMENTS OF THE INVENTION

The invention is explained in more detail in the following text on the basis of an advantageous exemplary embodiment illustrated in the figures. The invention is not limited to this exemplary embodiment, however. The figures illustrate the subject matter of the invention only schematically. In the figures.

Figure 1:
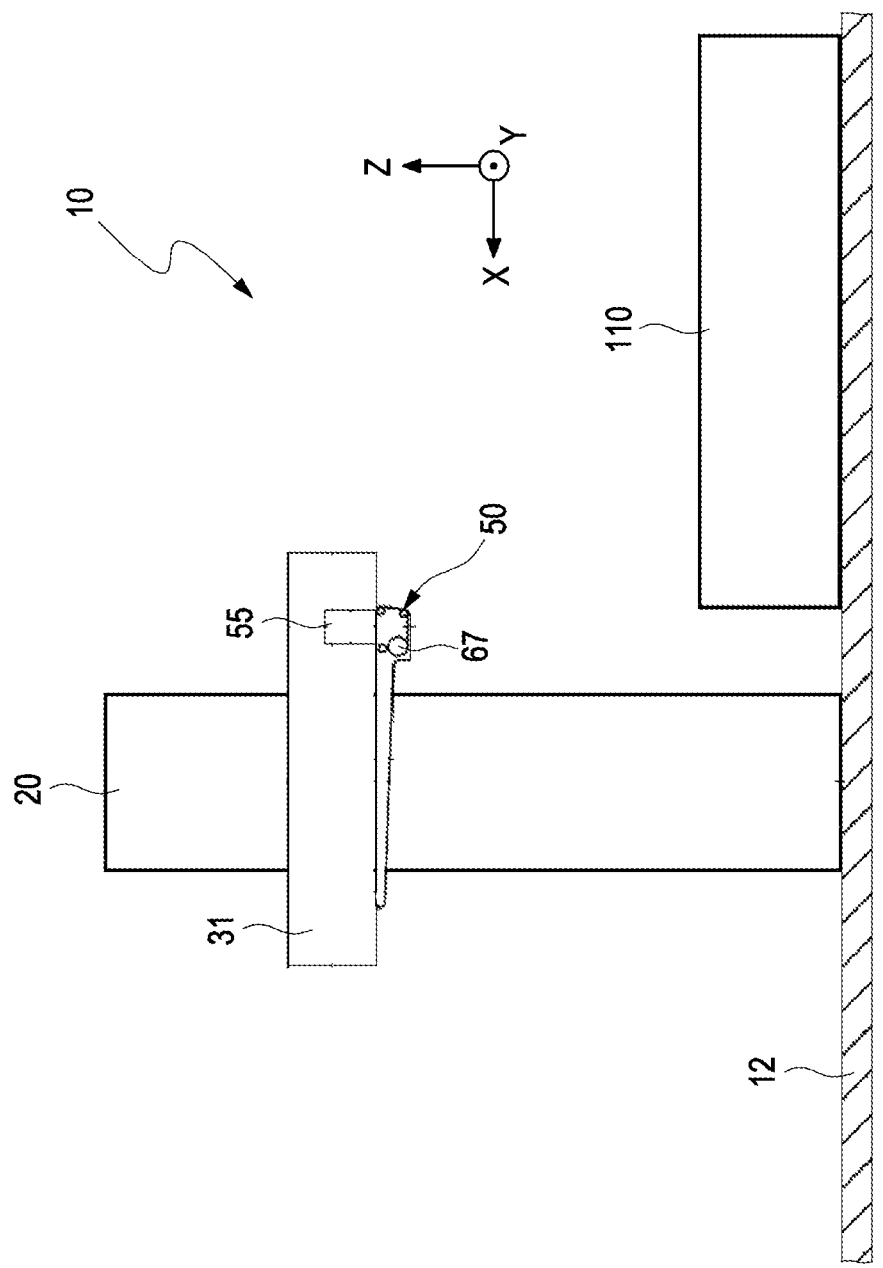
FIG. 1 shows a schematic front view of a palletizing apparatus.

FIG. 1 shows a schematic front view of a palletizing apparatus 10. The palletizing apparatus 10 stands on a floor 12 and serves to set down goods (not illustrated here) on a pallet (likewise not illustrated here). The goods are fed to the palletizing apparatus 10 by a feed apparatus 110. In this case, first of all the goods are combined by the feed apparatus 110 into stackable layers and subsequently transported further in a longitudinal direction X to the palletizing apparatus 10. The longitudinal direction X extends parallel to the floor 12.

The palletizing apparatus 10 comprises a lifting apparatus 20, which extends substantially in a vertical direction Z away from the floor 12. The vertical direction Z extends at right angles to the floor 12 and at right angles to the longitudinal direction X.

Arranged on the lifting apparatus 20 is a carriage 31, which is movable in the vertical direction Z. Fastened to the carriage 31 is a set-down belt 50. The set-down belt 50 is thus movable in the vertical direction Z relative to the lifting apparatus 20. The set-down belt 50 is additionally movable in the longitudinal direction X relative to the carriage 31 and to the lifting apparatus 20. The set-down belt 50 has a drive motor 55, which serves to drive a drive drum 67.

Figure 2:
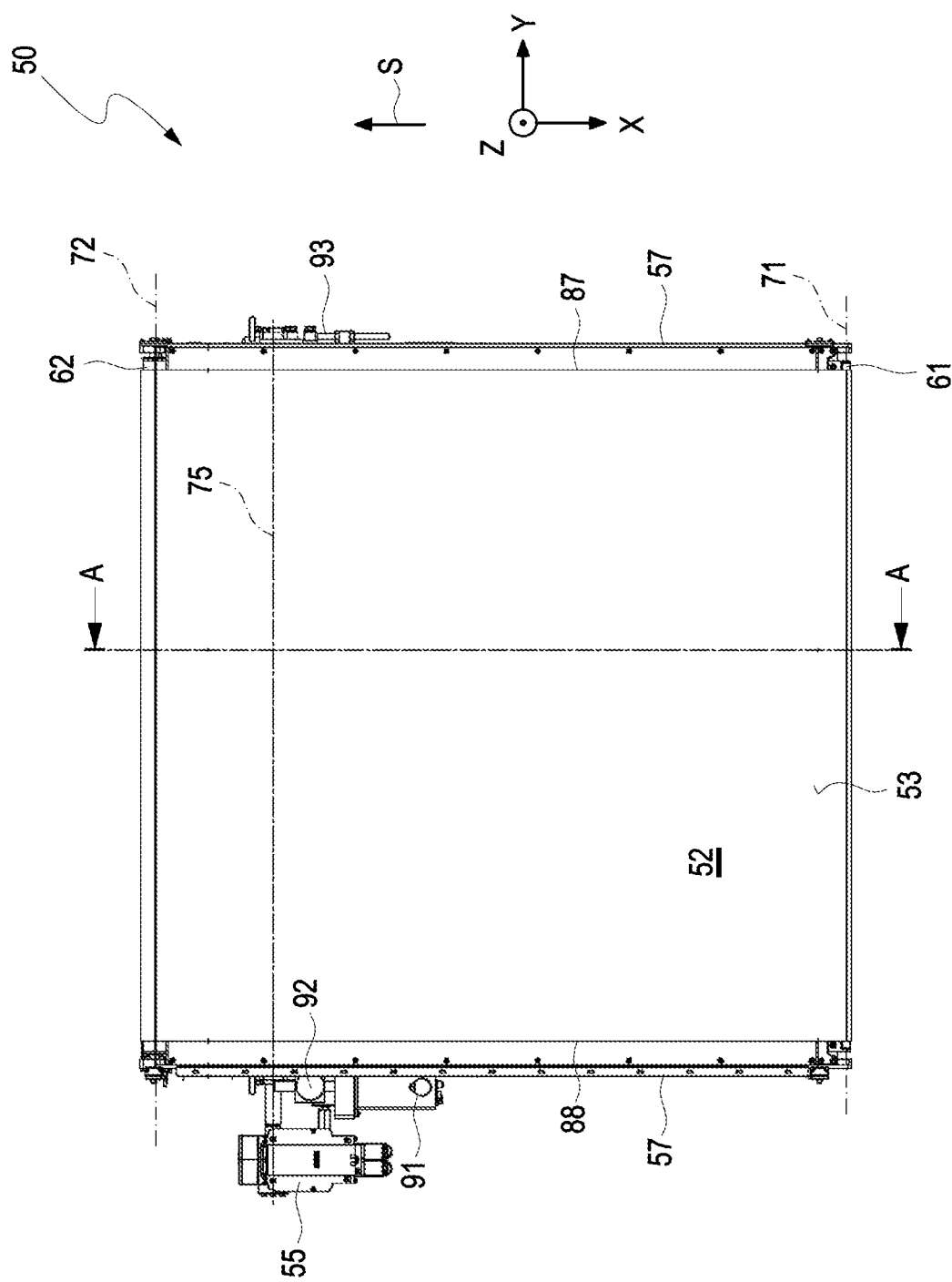
FIG. 2 shows a plan view of a set-down belt.

FIG. 2 shows a plan view of the set-down belt 50, illustrated in FIG. 1, of the palletizing apparatus 10. The lifting apparatus 20 and the carriage 31 arranged thereon are not illustrated in this case.

The set-down belt 50 comprises a first deflection roller 61, which is rotatable about a first axis of rotation 71. The set-down belt 50 also comprises a second tensioning roller 62, which is rotatable about a second axis of rotation 72. Furthermore, the set-down belt 50 comprises a tensioning roller 65 (not illustrated here), which is rotatable about a tensioning axis 75. The first axis of rotation 71 and the second axis of rotation 72 extend parallel to one another in a transverse direction Y, which is oriented at right angles to the longitudinal direction X and at right angles to the vertical direction Z.

The set-down belt 50 also comprises a circulating conveyor belt 52, which defines a conveying face 53 for conveying the goods, or the layers. The conveying face 53 extends in a plane that is defined by the longitudinal direction X and the transverse direction Y. The vertical direction Z thus extends at right angles to the conveying face 53.

The conveying face 53 extends in the longitudinal direction X substantially between the first deflection roller 61 and the second deflection roller 62. In the transverse direction Y, the conveying face 53 is bounded by a first belt edge 87 and a second belt edge 88 of the conveyor belt 52. The conveying face 53 of the conveyor belt 52 is configured in a rectangular, predominantly approximately square, manner. The conveying face 53 has an extent in the transverse direction Y, which is also referred to as the width. The conveying face 53 has an extent in the longitudinal direction X, which is also referred to as the length. The width of the conveying face 53 thus corresponds in the present case at least approximately to the length of the conveying face 53.

The set-down belt 50 has two side walls 57, which extend predominantly in the longitudinal direction X and parallel to one another. The first deflection roller 61, the second deflection roller 62 and the tensioning roller 65 are mounted in the side walls 57. The distance of the side walls 57 from one another is slightly greater than the width of the conveying face 53.

The set-down belt 50 furthermore comprises an actuating motor 91 and a spindle gear 92 for acting on the tensioning roller 65 (not illustrated here). The actuating motor 91 and the spindle gear 92 are fastened to one of the two side walls 57. The drive motor 55 is also fastened to this side wall 57. Furthermore, the set-down belt 50 comprises a threaded spindle 93, likewise for acting on the tensioning roller 65 (not illustrated here). The threaded spindle 93 is fastened to the other of the two side walls 57.

Figure 3:
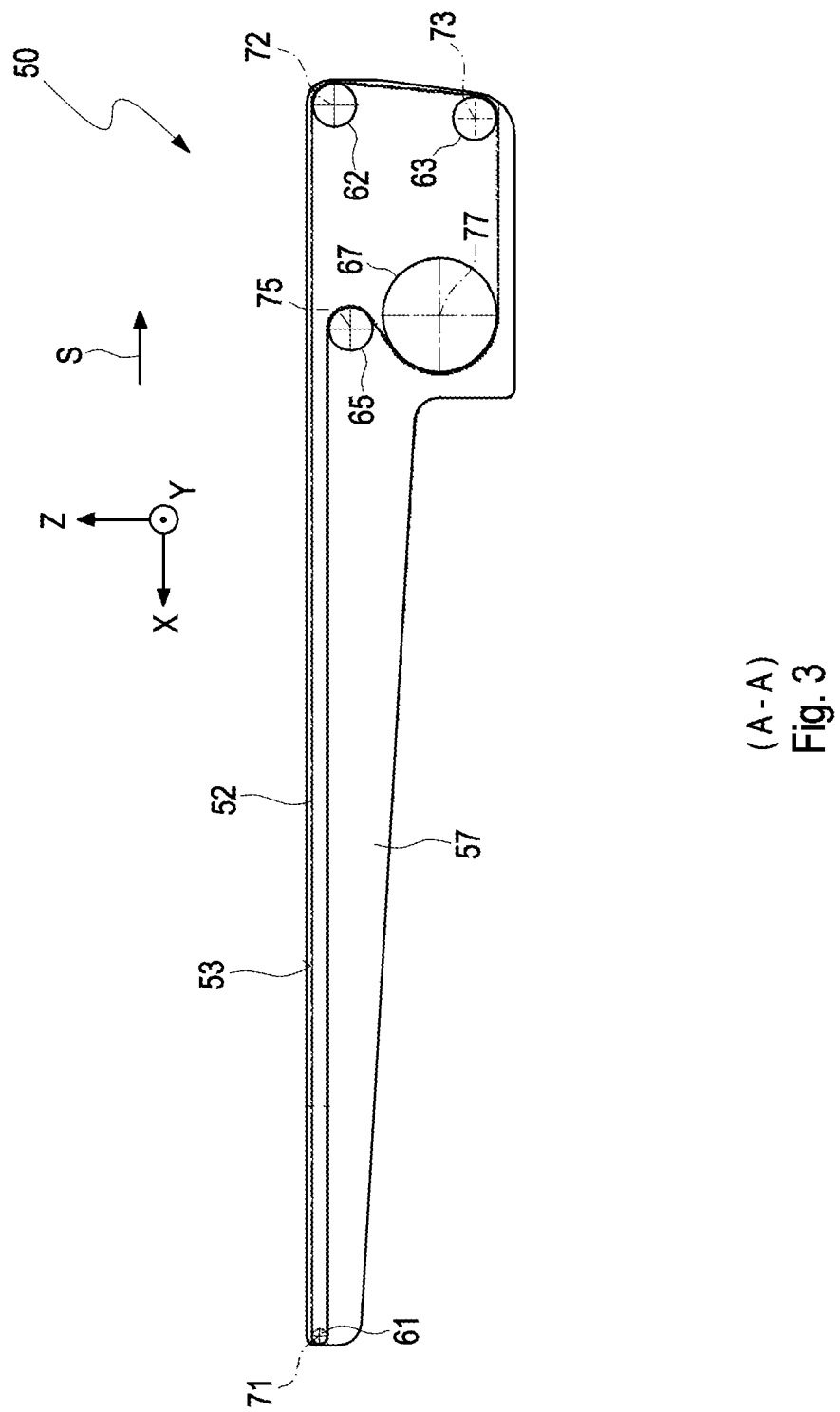
FIG. 3 shows a sectional illustration of the set-down belt along the section line A-A in FIG. 2.

FIG. 3 shows a sectional illustration of the set-down belt 50 from FIG. 2 along the section line A-A indicated therein. The set-down belt 50 comprises, as mentioned above, the first deflection roller 61, which is rotatable about the first axis of rotation 71, and also the second deflection roller 62, which is rotatable about the second axis of rotation 72, and the circulating conveyor belt 52.

The set-down belt 50 furthermore comprises the abovementioned tensioning roller 65, which is rotatable about the tensioning axis 75. Optionally, the set-down belt 50 comprises a third deflection roller 63, which is rotatable about a third axis of rotation 73. Furthermore, the set-down belt 50 comprises the drive drum 67, which is rotatable about a drive axis 77 and which is able to be driven by the drive motor 55 (not illustrated here).

The first axis of rotation 71, the second axis of rotation 72, the third axis of rotation 73 and the drive axis 77 extend parallel to one another in the transverse direction Y. In this case, in particular the third axis of rotation 73 and the drive axis 77 are arranged at a distance from the first axis of rotation 71 and the second axis of rotation 72 in the vertical direction Z. Therefore, the third deflection roller 63 and the drive drum 67 are also arranged at a distance from the conveying face 53 of the conveyor belt 52 in the vertical direction Z.

The drive drum 67 serves to drive the conveyor belt 52. When the conveyor belt 52 is driven by the drive drum 67, a good located on the conveying face 53 moves in the longitudinal direction X, in particular in the direction of the first axis of rotation 71.

The tensioning roller 65 is movable in a tensioning direction S. The tensioning roller 65 is in this case in particular movable in the tensioning direction S such that the tensioning axis 75 extends in an inclined manner with respect to the first axis of rotation 71 and in an inclined manner with respect to the second axis of rotation 72. The tensioning direction S extends parallel to the longitudinal direction X, and thus at right angles to the transverse direction Y and at right angles to the vertical direction Z.

Figure 4:
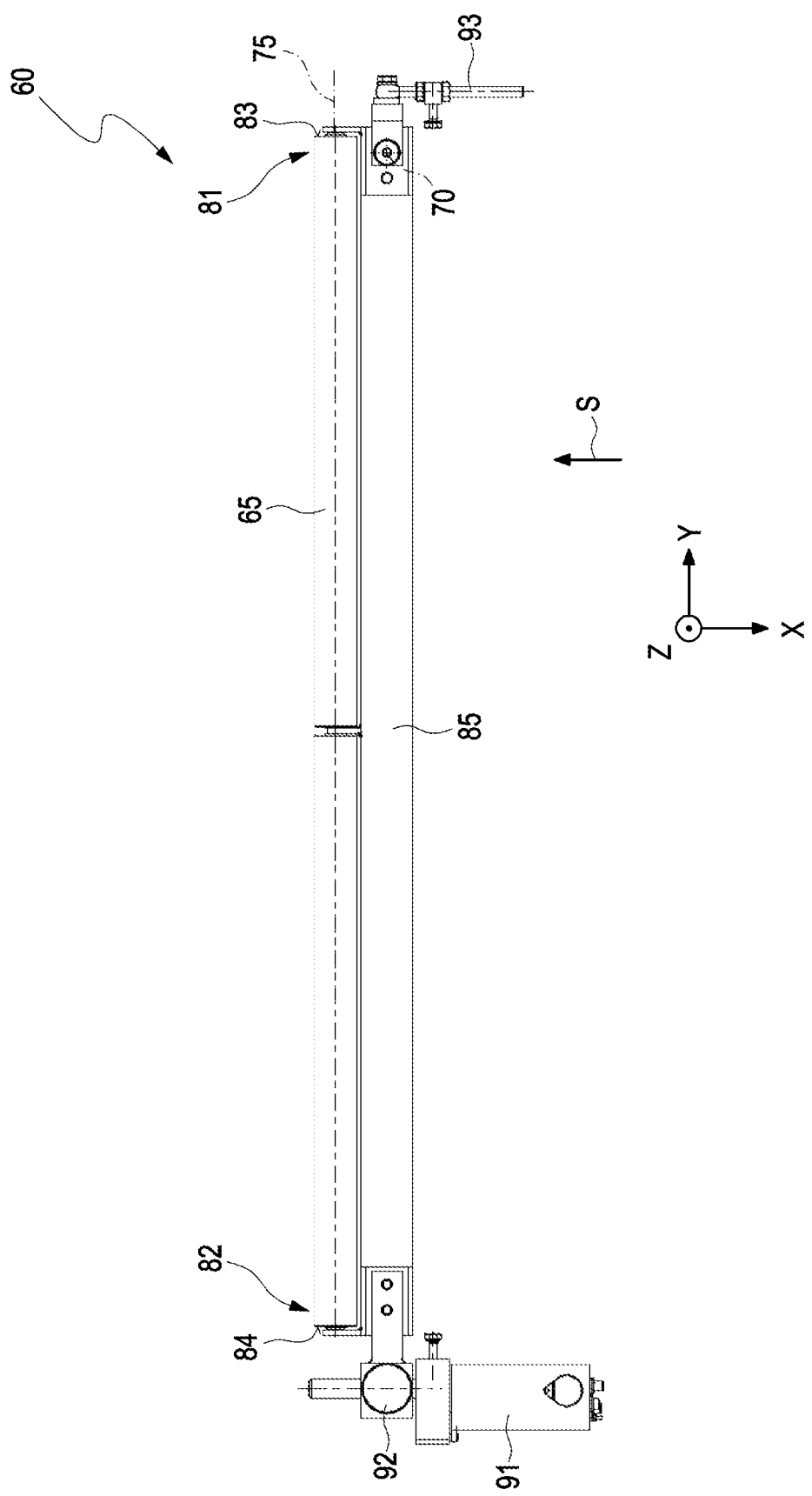
FIG. 4 shows a plan view of a tensioning station.

FIG. 4 shows a plan view of a tensioning station 60 of the set-down belt 50 illustrated in FIG. 2. The tensioning station 60 comprises in particular components that are concealed by the conveyor belt 52 in FIG. 2. The tensioning station 60 includes, inter alia, the tensioning roller 65, which is rotatable about the tensioning axis 75.

The tensioning roller 65 is advantageously formed in two parts and fastened to a cross member 85. The tensioning axis 75 is in this case positioned in a fixed position on said cross member 85. The cross member 85 is pivotable about a pivot axis 70. Thus, the tensioning roller 65 with the tensioning axis 75 is also pivotable about the pivot axis 70. The pivot axis 70 extends in the present case in the vertical direction Z. Thus, the pivot axis 70 extends at right angles to the first axis of rotation 71. The tensioning direction S extends at right angles, or tangentially, to the pivot axis 70. The tensioning axis 75 and the pivot axis 70 are oriented in a skew manner with respect to one another.

The tensioning roller 65 is bounded by a first end face 83 and a second end face 84. The two end faces 83, 84 of the tensioning roller 65 extend at right angles to the tensioning axis 75 and each define an end of the tensioning roller 65 in the direction of the tensioning axis 75.

A first axial end region 81 of the tensioning roller 65 extends from the first end face 83 in the direction of the tensioning axis 75 toward the opposite second end face 84. The first axial end region 81 also extends from the first end face 83 in the direction of the tensioning axis 75 away from the second end face 84. An extent of the first axial end region 81 in the direction of the tensioning axis 75 makes up in this case about 10% to 20% of the extent of the tensioning roller 65 in the direction of the tensioning axis 75.

A second axial end region 82 of the tensioning roller 65 extends from the second end face 84 in the direction of the tensioning axis 75 toward the opposite first end face 83. The second axial end region 82 also extends from the second end face 84 in the direction of the tensioning axis 75 away from the first end face 83. An extent of the second axial end region 82 in the direction of the tensioning axis 75 makes up in this case about 10% to 20% of the extent of the tensioning roller 65 in the direction of the tensioning axis 75.

The pivot axis 70 is arranged in the first axial end region 81 of the tensioning roller 65. The tensioning roller 65 extends approximately in the transverse direction Y, but, as mentioned above, is movable in the tensioning direction S, and in particular pivotable about the pivot axis 70. Thus, the tensioning roller 65 can extend in an inclined manner with respect to the transverse direction Y.

Actuating means for moving the tensioning roller 65 in the tensioning direction S are provided in the second axial end region 82 of the tensioning roller 65. The actuating means comprise the abovementioned actuating motor 91 and the spindle gear 92. The cross member 85 is coupled to the spindle gear 92 such that, upon rotation of the actuating motor 91, the cross member 85 is pivoted about the pivot axis 70. In the process, the second axial end region 82 of the tensioning roller 65 is deflected in the tensioning direction S.

The tensioning station 60 also comprises a sensor unit (not illustrated here) for identifying at least one belt edge 87, 88 of the conveyor belt 52, and an electronic regulating device. The regulating device is connected to the sensor unit and to the actuating motor 91 via corresponding data lines. If the sensor unit detects an offset of the belt edge 87, 88 of the conveyor belt 52 in the transverse direction Y, the regulating device controls the actuating motor 91 appropriately. As a result, the tensioning roller 65 is pivoted about the pivot axis 70 such that said offset of the belt edge 87, 88 in the transverse direction Y is compensated again.

The deflection of the second axial end region 82 in the tensioning direction S is in this case relatively small compared with the extent of the tensioning roller 65 in the direction of the tensioning axis 75, or in relation to a distance of the spindle gear 92 from the pivot axis 70. The tensioning direction S thus extends at least approximately at right angles to the transverse direction Y and at least approximately parallel to the longitudinal direction X.

Tensioning means for moving the tensioning roller 65 in the tensioning direction S are furthermore provided in the first axial end region 81 of the tensioning roller 65. In the present case, the tensioning means comprise the abovementioned manually actuable threaded spindle 93. Upon appropriate actuation of the threaded spindle 93, the cross member 85 is moved with the pivot axis 70 in the tensioning direction S. In the process, the first axial end region 81 of the tensioning roller 65 is also moved in the tensioning direction S.

In a further configuration, the tensioning means likewise comprise, in the first axial end region 81 of the tensioning roller 65, an actuating motor 91 and a spindle gear 92, similarly to the actuating means in the second axial end region 82 of the tensioning roller 65. Preferably, a sensor unit for identifying the mechanical tension in the conveyor belt 52 is also provided. This allows simultaneous regulation of the tension in the conveyor belt 52.

The invention is not limited to the exemplary embodiments described here and the aspects highlighted therein. Rather, a large number of modifications that lie within the capabilities of a person skilled in the art are possible within the scope defined by the claims.

LIST OF REFERENCE SIGNS

10 Palletizing apparatus
12 Floor
20 Lifting apparatus
31 Carriage
50 Set-down belt
52 Conveyor belt
53 Conveying face
55 Drive motor
57 Side wall
60 Tensioning station
61 First deflection roller
62 Second deflection roller
63 Third deflection roller
65 Tensioning roller
67 Drive drum
70 Pivot axis
71 First axis of rotation
72 Second axis of rotation
73 Third axis of rotation
75 Tensioning axis
77 Drive axis
81 First axial end region
82 Second axial end region
83 First end face
84 Second end face
85 Cross member
87 First belt edge
88 Second belt edge
91 Actuating motor
92 Spindle gear
93 Threaded spindle
110 Feed apparatus
A Section line
S Tensioning direction
X Longitudinal direction
Y Transverse direction
Z Vertical direction

The invention claimed is:

1. A set-down belt for a palletizing apparatus, comprising a circulating conveyor belt that defines a conveying face for conveying goods, a first deflection roller that is rotatable about a first axis of rotation, a tensioning roller that is rotatable about a tensioning axis, movable in a tensioning direction (S), and pivotable about a pivot axis, the pivot axis arranged in a first axial end region of the tensioning roller, wherein a second deflection roller that is rotatable about a second axis of rotation is provided, wherein the second axis of rotation extends parallel to the first axis of rotation, wherein the tensioning roller is movable such that the tensioning axis extends in an inclined manner with respect to the first axis of rotation and in an inclined manner with respect to the second axis of rotation, wherein the tensioning means comprise an actuating motor and a spindle gear, and wherein the tensioning means for moving the tensioning roller in the tensioning direction (S) are provided in the first axial end region of the tensioning roller, the tensioning means comprising a manually actuable threaded spindle.

2. The set-down belt as claimed in claim 1, wherein the pivot axis extends at right angles to the first axis of rotation.

3. The set-down belt as claimed in claim 1, wherein the pivot axis extends at right angles to the conveying face of the conveyor belt.

4. The set-down belt as claimed in claim 1, wherein the tensioning axis intersects the pivot axis.

5. The set-down belt as claimed in claim 1, wherein actuating means for moving the tensioning roller in the tensioning direction (S) are provided in a second axial end region of the tensioning roller, which is opposite the first axial end region of the tensioning roller.

6. The set-down belt as claimed in claim 5, wherein the actuating means comprise an actuating means actuating motor and an actuating means spindle gear.

7. The set-down belt as claimed in claim 1, wherein the tensioning direction (S) extends at right angles to the first axis of rotation and at right angles to the pivot axis.

8. The set-down belt as claimed in claim 1, wherein a third deflection roller that is rotatable about a third axis of rotation is provided, wherein the third axis of rotation extends parallel to the first axis of rotation.

9. The set-down belt as claimed in claim 1, wherein a drive drum that is rotatable about a drive axis is provided, wherein the drive axis extends parallel to the first axis of rotation.

10. A palletizing apparatus comprising at least one set-down belt as claimed in claim 1.

\* \* \* \* \*